(12) United States Patent
Cohen et al.

(10) Patent No.: US 11,435,933 B2
(45) Date of Patent: Sep. 6, 2022

(54) USING ANY-PIT BACKUPS FOR RETROACTIVE BACKUP COMPLIANCE AND HARDENING

(71) Applicant: EMC IP Holding Company LLC, Hopkinton, MA (US)

(72) Inventors: Saar Cohen, Moshav Mishmeret (IL); Jehuda Shemer, Kfar Saba (IL); Valerie Lotosh, Ramat-Gan (IL); Erez Sharvit, Ramat Gan (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/785,288

(22) Filed: Feb. 7, 2020

(65) Prior Publication Data
US 2021/0247904 A1    Aug. 12, 2021

(51) Int. Cl.
*G06F 3/06* (2006.01)
*G06F 11/14* (2006.01)

(52) U.S. Cl.
CPC ............ *G06F 3/065* (2013.01); *G06F 3/0619* (2013.01); *G06F 3/0641* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 9,600,377 B1 * | 3/2017 | Cohen | G06F 11/1453 |
| 9,720,618 B1 | 8/2017 | Panidis et al. | |
| 10,061,657 B1 * | 8/2018 | Chopra | G06F 11/1461 |
| 10,101,943 B1 | 10/2018 | Ayzenberg et al. | |
| 10,157,014 B1 | 12/2018 | Panidis et al. | |
| 10,437,783 B1 | 10/2019 | Cohen et al. | |
| 2008/0109448 A1 * | 5/2008 | Aboel-Nil | G06Q 10/107 |
| 2010/0318812 A1 | 12/2010 | Auradkar et al. | |
| 2015/0026422 A1 | 1/2015 | Dudgeon et al. | |
| 2016/0283329 A1 | 9/2016 | Natanzon | |
| 2017/0031783 A1 | 2/2017 | Kedem et al. | |
| 2017/0083540 A1 | 3/2017 | Mamluk et al. | |
| 2018/0210793 A1 | 7/2018 | Mamluk | |
| 2018/0225052 A1 | 8/2018 | Rogers et al. | |
| 2020/0409583 A1 | 12/2020 | Kusters et al. | |
| 2021/0081432 A1 | 3/2021 | Grunwald et al. | |

FOREIGN PATENT DOCUMENTS

EP      1959346 A2    8/2008

OTHER PUBLICATIONS

International Search Report and Written Opinion received for PCT Patent Application No. PCT/US21/16395, dated May 14, 2021, 24 pages.

* cited by examiner

*Primary Examiner* — Michael Alsip
(74) *Attorney, Agent, or Firm* — Workman Nydegger

(57) ABSTRACT

Retroactive backup compliance. A data stream from a production site is stored in secondary storage associated with a data protection system. In response to an event such as a regulation change or a service level agreement change, backups are generated retroactively from the stored data stream. Backups are generated to correspond to times in the past. Backups can also be replaced, deleted, or generated ad-hoc. Further, the retroactively generated backups are generated to be consistent.

20 Claims, 5 Drawing Sheets

USING ANY-PIT BACKUPS FOR RETROACTIVE BACKUP COMPLIANCE AND HARDENING

RELATED APPLICATIONS

This application is related to U.S. patent application Ser. No. 16/785,230, entitled "USING BUSINESS CONTINUITY AND DISASTER RECOVERY FOR ANY POINT IN TIME BACKUP", filed on the same day as the present application, the entire disclosure of which is incorporated herein by this reference.

FIELD OF THE INVENTION

Embodiments of the present invention generally relate to data protection and to data protection operations. More particularly, at least some embodiments of the invention relate to systems, hardware, software, computer-readable media, and methods for performing data protection operations including generating retroactive point in time backups and to backup compliance.

BACKGROUND

A primary purpose of backup applications is the ability to generate a backup of production data. While generating a backup seems straightforward, the process can be quite complicated. Backup applications need to account for a wide variety of system/application/data configurations, network configurations, storage configurations, and the like. In addition, it is often insufficient to simply generate a backup of the production data at least because the production data is continually changing. A backup application may generate and store multiple backups.

The primary use of a backup is to allow an entity to recover its data from the backups. This may be necessary, for example, when the entity's data is deleted (accidently or maliciously), attacked, wrongly modified, or corrupted. Another reason for maintaining backups is to support or comply with various regulations and certifications. In many industries, such as banking, healthcare, and insurance, there are regulations that specify how backups should be handled. These may refer, among a variety of factors, to the location of the backups, the cadence at which the backups are taken, and how long the backups should be retained.

For example, a regulation may state that, for organization to be compliant, the backups of specific data need to be taken at least once every week, and backups need to be kept for at least a year. This may be specified in a service level agreement (SLA).

However, regulations (like data) often change. While an entity's backups may support or comply with current regulations, new regulations may be promulgated. For example, instead of requiring a backup once a week, the new regulation may require a backup once a day. Conventionally, this can only be supported in a forward looking manner from the time at which the regulation becomes effective.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
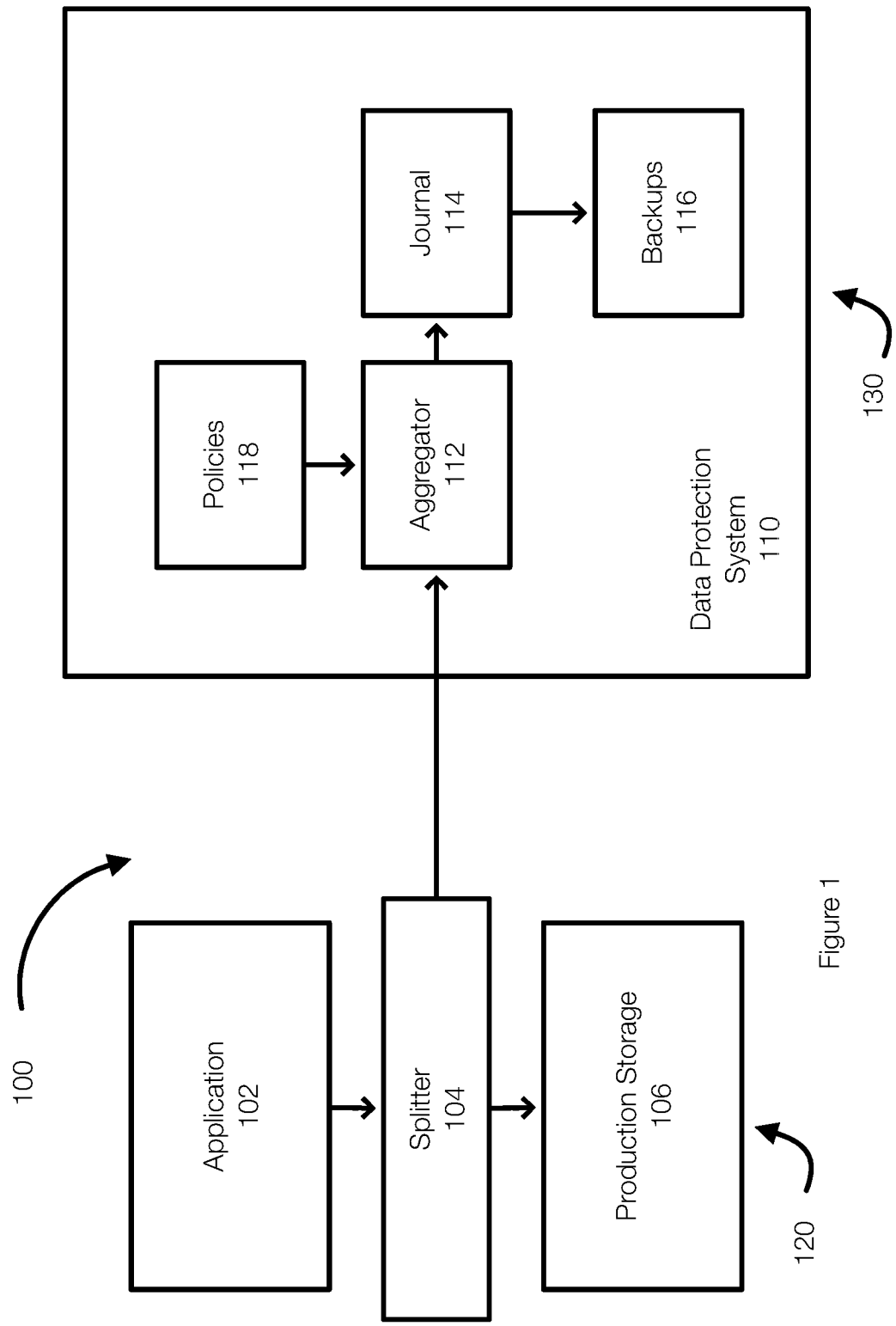
FIG. 1 illustrates an example of an environment in which data protection operations including retroactive backup generation are performed.

Embodiments of the present invention generally relate to data protection operations. More particularly, at least some embodiments of the invention relate to systems, hardware, software, computer-readable media, and methods for performing data protection operations that may include, but are not limited to, backup operations, restore operations, point-in-time operations, backup synthesis operations, policy operations, forward and/or backward looking data protection operations including backup generation, journal based data protection operations, replication operations, backup hardening operations, continuous replication operations, or the like or combination thereof.

Data operations such as backup operations can be performed by storing a journal on a secondary storage (e.g., local or cloud based secondary storage). More specifically, input/output (IO) to a primary storage or to production data can be replicated to a secondary storage system or device and storage as a journal or as a journal stream. In one example, the journal or journal stream represents all of the transactions that occurred to the production data. Using virtual synthesis on the journal stream, backups or backup images can be generated from the journal stream. This can eliminate the need to generate to take snapshots at the production site. In addition, this enables any point in time backup functionality (as long as the point in time is represented in the journal). The journal, because it contains the IO transactions (often in a chronological order), can be used to generate backups at specific points in time.

Embodiments of the invention provide a higher degree of control and freedom over the backups that an entity may maintain in the secondary storage (or in other storage). Embodiments of the invention allow an entity to retroactively conform to new service level agreements and facilitate the adoption of and compliance with new service level agreements or regulations more quickly and with less disruption to the production data or site.

In one example, backup data may be generated by a data protection system. The backup data, which may include or be a journal or a journal stream, may be generated using continuous replication for example. As IOs occur at the production site, the data associated with the IO is continuously replicated. The data is replicated to and stored in secondary storage.

In addition to generating backups retroactively or in a backward looking manner, embodiments of the invention ensure that these retroactively generated backups are consistent and can be used to obtain valid and consistent data. In effect, the retroactively generated backups can be hardened. More specifically, the images or snapshots are hardened, which indicates that the images or snapshots are consistent and that a valid copy of the production data can be generated therefrom. This increases the flexibility of the data protection system and reduces the effort and disruption that would otherwise be required to respond to changing needs, such as when new regulations are promulgated.

More specifically, an incoming data stream to a secondary storage or replica site, which essentially replicates reads/writes at the production site to the secondary storage, is stored by the data protection system (e.g., Dell Data Domain or Dell RecoverPoint). The data stream allows backups to be generated from the data stream as required. While using virtual machine or array snapshots to generate backups has many advantages, embodiments of the invention are able to create a backup scheme without the use of native snapshots. Instead, a copy of a continuously streaming IO source (e.g., using mirroring devices or splitters) is captured or generated.

An aggregator may perform various tasks to optimize the data format of the data in the data stream, such as fixing alignment and batching to generate large IOs. Once this is done, the data is sent to the data protection system, where the data stream is kept in or as a journal. This journal is stored in a way that makes the journal efficient to analyze and process.

Once the data stream is stored on or by the data protection system as a journal, the journal may be processed to generate point-in-time backups. The backups (which may be images or snapshots) may be generated by the data protection system using virtual synthesis capabilities. Generating a snapshot from the journal using virtual synthesis is distinct from taking a snapshot of the production data or volumes. For example, an image or snapshot can be generated by applying the transactions in the journal to an existing backup (this can be done chronologically in a forward looking manner and a backward looking manner). Advantageously, a backup can be generated from any point-in-time that is represented in the journal. These backups can then be used in the same way any "traditional" backup is handled. When creating these backups from the journal, the journal itself is preserved. Preserving the journal has a very low storage overhead due do the manner in which the data protection system (e.g., DELL Data Domain) stores and deduplicates data.

Because the journal is persisted in embodiments of the invention, the journal is available for further processing if desired. Persisting the journal allows backup images to be generated retroactively, without having to refer to the production or source data in any way. Further, there is no further requirement to fill in additional data which, by the time the backup is generated may not be available from the production system.

FIG. 1 illustrates an example of a system configured to perform data protection operations. FIG. 1 illustrates a system 100 that includes a production site 120 and a replica site 130. The replica site 130 may be on-premise, cloud-based, or the like. In this example, which is presented by way of example and not limitation, an application 102 may interact with production storage 106. The production storage 106 stores data used by the application 102 and other applications.

The application 102 may write to the production storage 106. In this example, a splitter 104 effectively intercepts the write and sends a copy of the data being written to the production storage 106 to the replica site 130. This allows the replication of the production data to be performed in real-time or near real-time.

An aggregator 112 may perform processing on the data received from or transmitted by the splitter 104 (the splitter 104 may be a part of the data protection system). The aggregator 112, which may also be a part of the data protection system 110, may align the data, batch the data for larger transfers, de-duplicate the data, compress the data, encrypt the data or the like.

The data is received by the data protection system 110 operating at the replica site 130. The data protection system 110 may also operate at the production site or have components at both locations. The replicated data is received by the data protection system 110 or by the replica site 130 and is stored in a journal 114. The journal 114 is persisted. The journal 114 may be persisted for some length of time.

Using synthesis and/or virtual synthesis operations, backups 116 can be generated from the journal 114. Further, the journal or stream or writes is stored by the backup system and has little impact on the required capacity because the data stored by the data protection system can be de-duplicated.

Thus, the data protection system 110 stores point in time (PiT) backups using a continuous IO stream source. The data protection system 110 is configured to accept backup policies 118 (which may include regulations) and generate backups accordingly. These policies 118, by way of example only, may include the cadence between backups and/or the retention of backups (e.g., a time period or number of backups).

Figure 2:
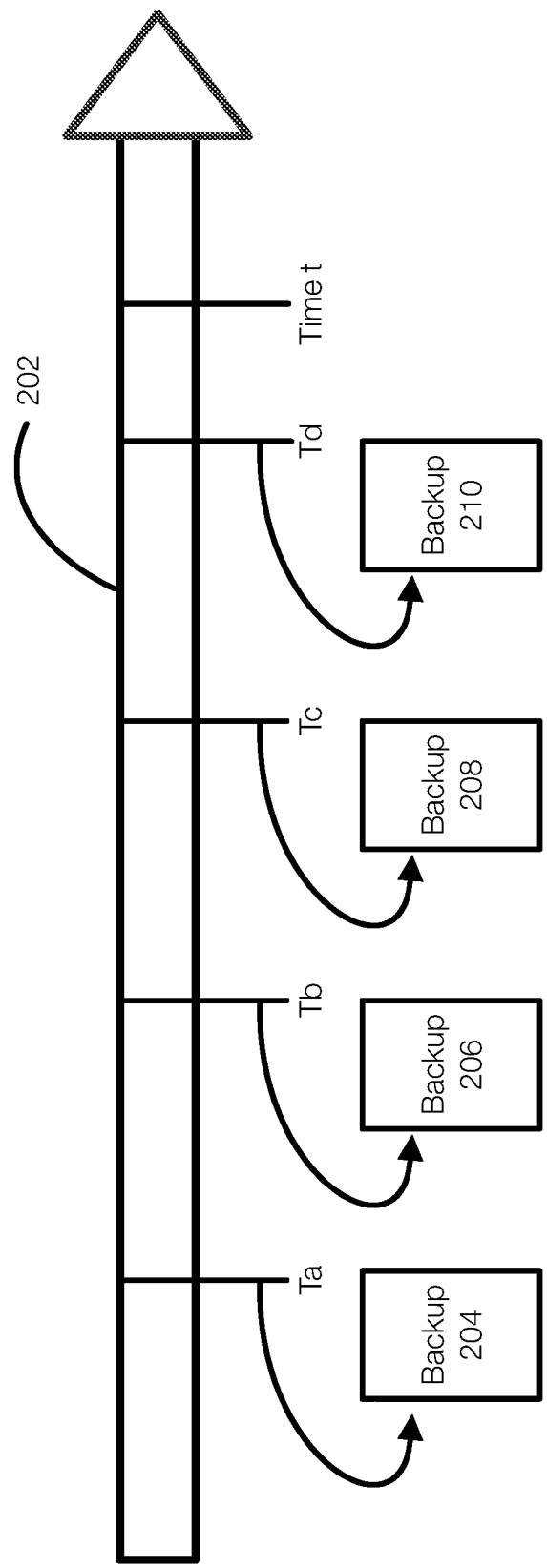
FIG. 2 illustrates an example of backups generated from a journal.

FIG. 2 illustrates an example of a journal that is stored by a data protection system and used to generate backups. FIG. 2 illustrates a journal 202, which is an example of a write stream that may be received from a splitter associated with the source data. The journal 202 is persisted by the data protection system.

In this example, the journal 202 is used to generate a backup at a regular cadence. If the cadence is one week, for example, then the backups 204, 206, 208 and 210 correspond to weekly backups generated at, respectively, times Ta, Tb, Tc and Td. Thus, the times Ta and Tb represent a time period of one week. The backups 204, 206, 208 and 210 are generated from the journal 202 without any reference to the source data at the production site.

Figure 3:
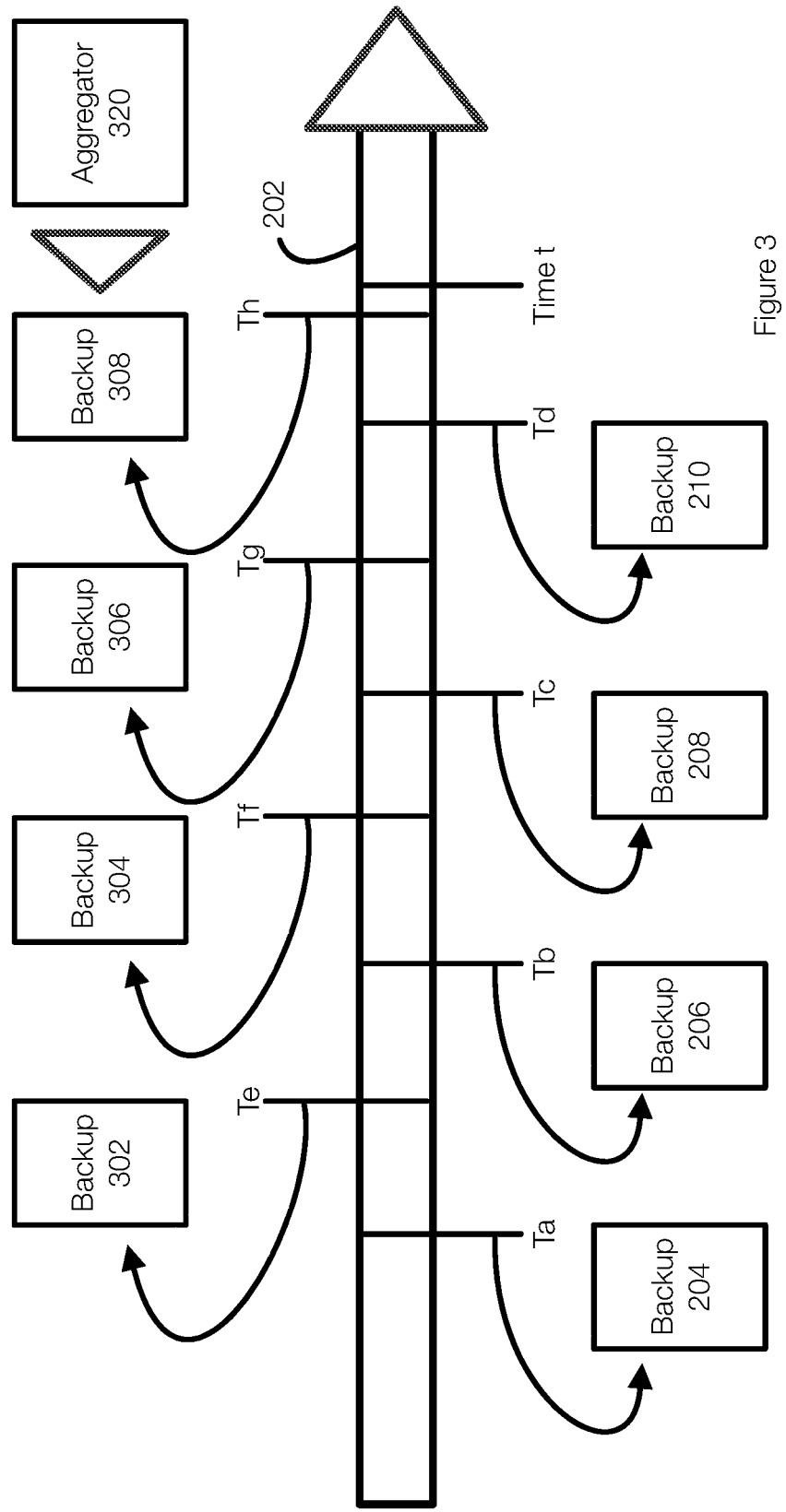
FIG. 3 illustrates an example of backups retroactively generated from a journal based on an event.

FIG. 3 illustrates an example of the journal illustrated in FIG. 2 after an event occurs. The event may be a requirement to comply with a new regulation. With references to FIGS. 2 and 3, an entity associated with the journal 202 may be required to conform to a new regulation. Instead of performing or generating a backup at a weekly cadence, the regulation requires the backup to be performed or generated twice a week.

More specifically, the entity is required at time t to conform with a new regulation. Normally, this would modify the online backup tools such that the next backup would occur at time t plus 3 days. Further, compliance is done from time t and forward.

As illustrated in FIG. 3, the data protection system or an aggregator 320 can use the journal 202 to retroactively construct a new set of backups, represented by the backups 302, 304, 306 and 306. These backups may be virtually synthesized using the journal 202 and/or other backups stored by the data protection system. The result is illustrated in FIG. 3, which illustrates backups that are taken at a cadence of twice a week in order to comply with a new regulation. This allows the data protection system to comply retroactively and in a forward looking manner.

More specifically, the new regulation can be automatically applied to new backups and to the history of backups being maintained. In addition to adding new backups, embodiments of the invention allow existing backups to be removed, allow existing backups to be removed and replaced with backups at other times, or as otherwise required by any policy or regulation.

Embodiments of the invention, which may be continuous data replication solution such as Dell EMC RecoverPoint, may ensure that any point in time is guaranteed to be crash-consistent. More specifically, this indicates that any point in the data stream represents a data image that existed at that exact point in time on the source storage system or device.

However, there may be some cases where the data protection system is missing some writes and, due to some disruptions and outages, the data protection system may not be able to complete the information about those missing IOs or writes until a later time. One such example is a case where a VM running on ESX-1 (ESX is an example of a hypervisor) is moved to ESX-2 due to ESX-1 failing. It is possible that the ESX-1 failure started with networking to the data protection system (e.g., RecoverPoint appliance is an example of a data protection system) being disrupted, followed shortly after by the full failure. In this case it is possible that the data protection system will not get any indication from ESX-1 on the failure, and some IOs may already arrive at the storage from ESX-1 before the ESX-1 totally fails. The knowledge about those missing IOs is kept locally and persistently in ESX-1 by the splitter running there, but this information is not available until ESX-1 returns.

As a result, embodiments of the invention may continue replicating from ESX-2. Only at a later stage where ESX-1 returns will the data protection system understand that the data-stream between the network outage of ESX-1 to the return of ESX-1 is actually not crash-consistent due to the missing IOs.

In such situations, embodiments of the invention can retroactively mark the time-region where data is not consistent, and avoid using that data when recovering or when generating backups. The rest of the time, where there are no known failures, can be considered safe and snapshots taken or generated during this time are considered hardened or consistent.

Figure 4:
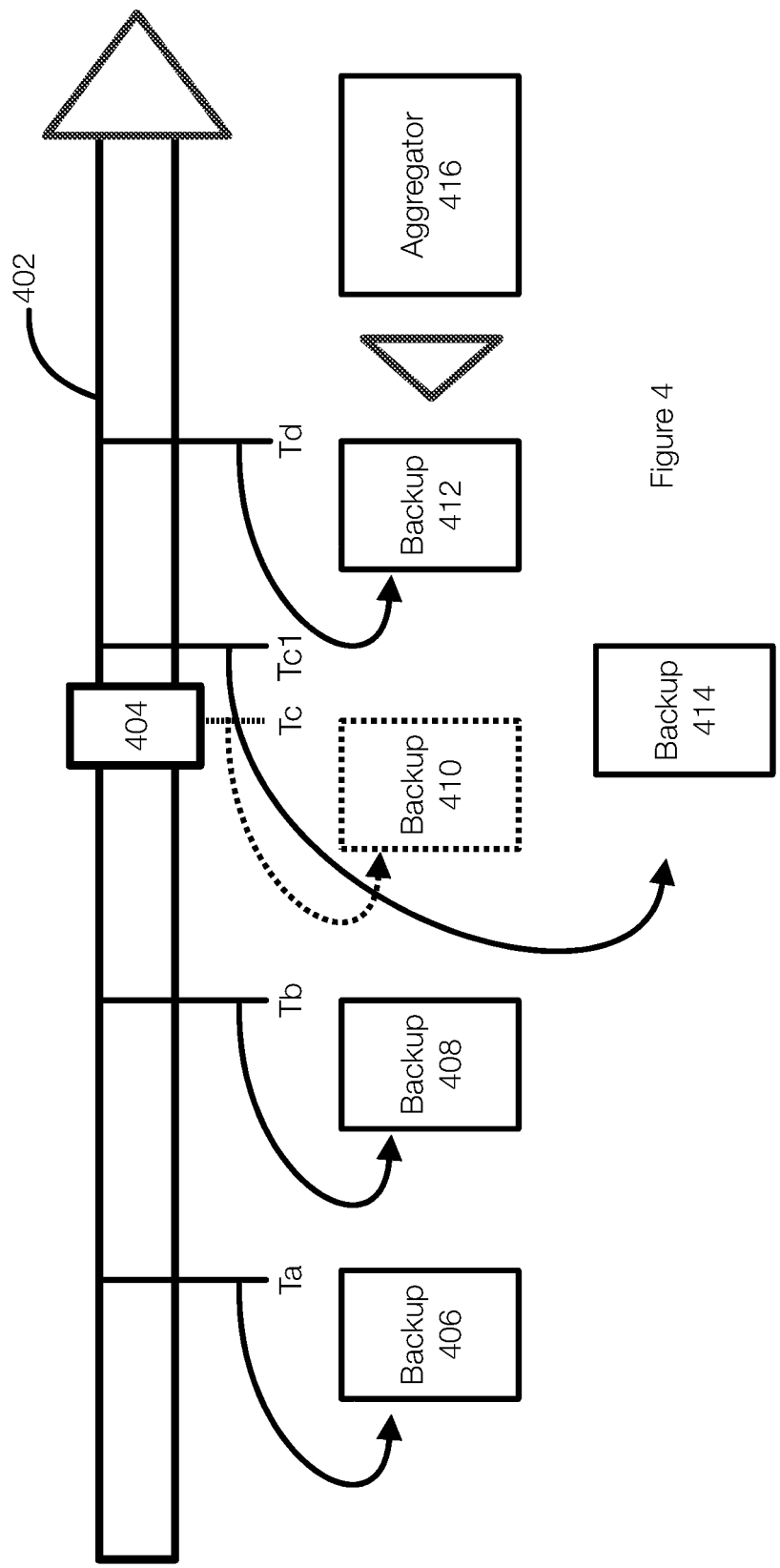
FIG. 4 illustrates an example of hardening a backup, which includes replacing a backup associated with an inconsistent portion of a journal.

FIG. 4 illustrate an example of generating backups in the context of a less than fully consistent region of time in the journal. FIG. 4 illustrates backups 406, 408, 410 and 412 that are taken or generated from a journal 402 at, respectively, times Ta, Tb, Tc and Td. FIG. 4 illustrates that the journal 402 includes a time region 404. The portion of the journal 402 associated with the region 404 may not be fully consistent or it may be discovered that the region 404 is not fully consistent.

As a result, the backup 410, which is taken during time Tc is not consistent and cannot be used. The aggregator 416, once receiving a notification that the time region 404 is not consistent, can use a heuristic or other feature to handle any backups that may be associated with the time region 404.

The heuristic may be one or more of (and may be based or determined on based on the data source) deleting the backup 410, replacing the backup 410 with another backup that is generated or taken from a time prior to the time region 404 or from a time after the time region 404, or both. In FIG. 4, the backup 410 is replaced with a backup 414, which is generated at the time Tc1, which is after the time region 404. This newly generated backup may be guaranteed to be consistent.

In this example, the original set of backups (e.g., illustrated in FIG. 2) are not impacted or modified in some embodiments. They can be deleted or replaced, however. Further, these backups can be locked to protect against deletion.

Backups generated in hindsight can also be tagged as retroactively generated backups. This helps identify the backups that were generated by the data protection system or that may be synthesized from the journal. Further, these backups can be tagged to identify the policy with which they conform. This allows backups to be managed. For example, if a policy was applied by mistake, the associated backups can be identified and deleted.

In some examples, backups are taken on an ad-hoc basis. For example, a backup may taken before a significant change is expected. For example, a backup is usually taken before major software upgrade, before a critical time for the organization (like new-years shopping in a retail website), before significant configuration changes and so on.

This assumes that the backup administrator has a-priori knowledge of the changes planned and can perform the backup in time. This is not always the case, as some changes are unplanned, and some are simply not known to the backup administrator. Embodiments of the invention enable retroactively creating those backups after the fact and can provide means for the backup administrator to "go back in time" and create a backup before the disruption happened. In a sense this replaces the "backup now" option in existing backup systems with a "backup X days ago" option.

Embodiments of the invention thus allow or enable the retroactive creation of backups based on new requirements. This gives the ability to comply with new regulations and SLAs "in hindsight", where the compliance actually begins in the past, rather than in the current point in time The ability to mark backups that are found to be inadequate or inconsistent (in testing or through automatic detection), and amend those backups that by generating new backups from roughly the same time is disclosed. These new backups, which are consistent, can be used instead of inconsistent backups.

Figure 5:
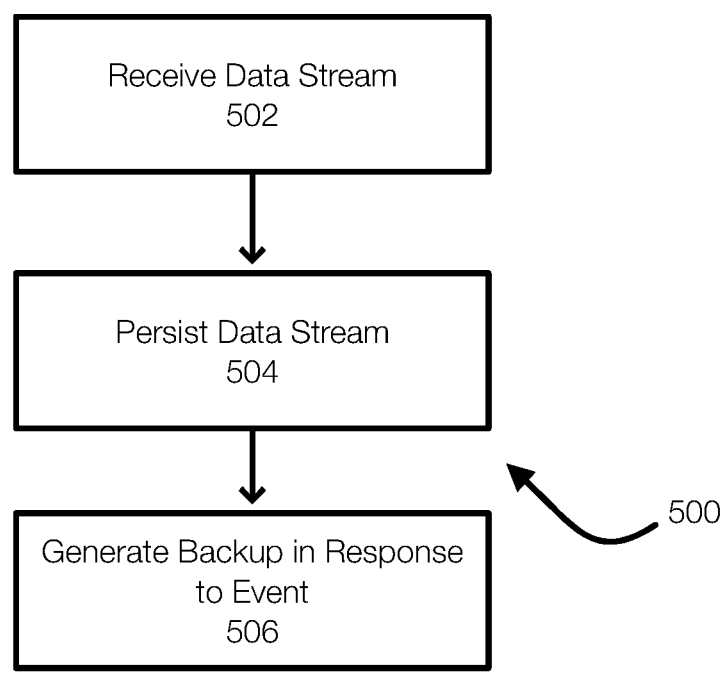
FIG. 5 illustrates an example of a method for performing a data protection operation such as generating backups retroactively.

FIG. 5 illustrates an example of a method for protecting data and which may include retroactively generating backups. FIG. 5 illustrates a method 500 for protecting data. In FIG. 5, a data stream is received 502 at a data protection system. The data protection system may be an appliance (virtual and/or physical), cloud-based, on-premise, or the like. The data protection system may have its own storage and/or may use cloud—based storage. The data protection system may generate backups that can be used to recover production data. Embodiments of the invention may also be used to provide data protection for virtual machines and other applications and be used for point in time disaster recovery or the like.

When the data stream is received, the data stream may also be persisted 504 by the data protection system. The data may be stored, for example, in a de-duplicated form such that the journal and the backups generated from the journal may use the same data. This reduces the storage needed to persist the journal. In one example, a copy of the production data may exist once the data stream starts to provide a starting point.

Next, a backup may be generated 506 from the journal in response to an event. The event may be a change in an SLA, a change in regulations or other compliance requirements.

The event may also be the detection of inconsistent data in the journal. One or more backups may be generated both retroactively and forward looking.

The backups generated in response to the event may be generated in accordance with the policy, a specified cadence, retention requirements, or the like. This may also result in the deletion of backups that may no longer be required. A deletion policy may exist that allows backups to be deleted accordingly.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations. Such operations may include, but are not limited to, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar and RecoverPoint platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example public cloud storage environments in connection with which embodiments of the invention may be employed include, but are not limited to, Microsoft Azure, Amazon AWS, and Google Cloud. More generally however, the scope of the invention is not limited to employment of any particular type or implementation of cloud storage.

In addition to the storage environment, the operating environment may also include one or more clients that are capable of collecting, modifying, and creating, data. As such, a particular client may employ, or otherwise be associated with, one or more instances of each of one or more applications that perform such operations with respect to data.

Devices in the operating environment may take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take various forms, such as a .VMDK file for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

Following are some further example embodiments of the invention. These are presented only by way of example and are not intended to limit the scope of the invention in any way.

Embodiment 1. A method for performing a data protection operation, the method comprising: receiving a data stream from a production site at a data protection system configured to perform the data protection operation, persisting the data stream at a storage associated with the data protection system, and generating a backup retroactively based on an event, wherein the backup is generated from the persisted data stream.

Embodiment 2. The method of embodiment 1, further comprising deduplicating the data stream.

Embodiment 3. The method of embodiment 1, and/or 2, further comprising receiving a new policy, wherein the event is the new policy and where the backup is generated to comply with the new policy.

Embodiment 4. The method of embodiment 1, 2, and/or 3, further comprising identifying a time region in the data stream that is inconsistent and deleting a backup associated with the time region.

Embodiment 5. The method of embodiment 1, 2, 3, and/or 4, further comprising generating a new backup from a point in time that is later than the time region or generating the new backup from a point in time that is earlier than the time region, wherein the new backup is consistent.

Embodiment 6. The method of embodiment 1, 2, 3, 4, and/or 5, wherein the event is a change in regulations associated with backups generated by the data protection system, a change in a cadence of the backups, a change in a retention period of the backups, detection go inconsistent data in the journal.

Embodiment 7. The method of embodiment 1, 2, 3, 4, 5, and/or 6, further comprising hardening the backup such that the backup is guaranteed consistent.

Embodiment 8. The method of embodiment 1, 2, 3, 4, 5, 6, and/or 7, further comprising virtually synthesizing the backup.

Embodiment 9. The method of embodiment 1, 2, 3, 4, 5, 6, 7, and/or 8, receiving a policy that is associated with backups generated by the data protection system, wherein the policy changes a schedule associated with the backups.

Embodiment 10. The method of embodiment 1, 2, 3, 4, 5, 6, 7, 8, and/or 9, further comprising applying a heuristic to backups associated with the data protection system in response to the event, wherein the heuristic is one of deleting a specific backup, replacing the specific backup with another backup that is associated with a different time than the specific backup.

Embodiment 11. A method for performing any of the operations, methods, or processes, or any portion of any of these, disclosed herein.

Embodiment 12. A non-transitory storage medium having stored therein instructions that are executable by one or more hardware processors to perform the operations of any one or more or portions thereof of embodiments 1 through 11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Any one or more of the entities disclosed, or implied, by the Figures and/or elsewhere herein, may take the form of, or include, or be implemented on, or hosted by, a physical and/or virtual computing device. As well, where any of the aforementioned elements comprise or consist of a virtual machine (VM), that VM may constitute a virtualization of any combination of the physical components.

In the example, the physical computing device includes a memory which may include one, some, or all, of random access memory (RAM), non-volatile random access memory (NVRAM), read-only memory (ROM), and persistent memory, one or more hardware processors, non-transitory storage media, UI device, and data storage. One or more of the memory components of the physical computing device may take the form of solid state device (SSD) storage. As well, one or more applications may be provided that comprise instructions executable by one or more hardware processors to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for performing a data protection operation, the method comprising:
   receiving a data stream from a production site at a data protection system configured to perform the data protection operation, wherein the data stream includes a journal of writes performed at the production site;
   generating backups from the data stream, the backups including a first backup;
   persisting the data stream at a storage by the data protection system; and
   generating a backup based on an event for a point in time in the past that is earlier than a time associated with the first backup, wherein the backup is generated by synthesizing the persisted data stream, wherein synthesizing the persisted data stream includes including, in the backup being generated, at least the writes in the journal from a backup in the backups that is associated with a backup created at a time earlier than the point in time up to the point in time in the past, wherein writes in the journal after the point in time in the past are not included in the backup being generated.

2. The method of claim 1, further comprising deduplicating the data stream.

3. The method of claim 1, further comprising receiving a new policy, wherein the event is the new policy and where the backup is generated to comply with the new policy.

4. The method of claim 1, further comprising identifying data in the data stream that is inconsistent, wherein the data is associated with a time region, and deleting a backup associated with the time region.

5. The method of claim 4, further comprising generating a new backup from a point in time that is later than the time region or generating the new backup from a point in time that is earlier than the time region, wherein the new backup is consistent.

6. The method of claim 1, wherein the event is a change in regulations associated with backups generated by the data protection system, a change in a cadence of the backups, a change in a retention period of the backups, detection go inconsistent data in the journal.

7. The method of claim 1, further comprising hardening the backup such that the backup is guaranteed consistent.

8. The method of claim 1, further comprising virtually synthesizing the backup.

9. The method of claim 1, receiving a policy that is associated with backups generated by the data protection system, wherein the policy changes a schedule associated with the backups.

10. The method of claim 1, further comprising applying a heuristic to backups associated with the data protection system in response to the event, wherein the heuristic is one of deleting a specific backup, replacing the specific backup with another backup that is associated with a different time than the specific backup.

11. A non-transitory storage medium having stored therein instructions that are executable by one or more hardware processors to perform operations comprising:
    receiving a data stream from a production site at a data protection system configured to perform the data protection operation, wherein the data stream includes a journal of writes performed at the production site;
    generating backups from the data stream, the backups including a first backup;
    persisting the data stream at a storage by the data protection system; and
    generating a backup based on an event for a point in time in the past that is earlier than a time associated with the first backup, wherein the backup is generated by synthesizing the persisted data stream, wherein synthesizing the persisted data stream includes including, in the backup being generated, at least the writes in the journal from a backup in the backups that is associated with a backup created at a time earlier than the point in time up to the point in time in the past, wherein writes in the journal after the point in time in the past are not included in the backup being generated.

12. The non-transitory storage medium of claim 11, the operations further comprising deduplicating the data stream.

13. The non-transitory storage medium of claim 11, the operations further comprising receiving a new policy, wherein the event is the new policy and where the backup is generated to comply with the new policy.

14. The non-transitory storage medium of claim 11, the operations further comprising identifying data in the data stream that is inconsistent, wherein the data is associated with a time region, and deleting a backup associated with the time region.

15. The non-transitory storage medium of claim 14, the operations further comprising generating a new backup from a point in time that is later than the time region or generating the new backup from a point in time that is earlier than the time region, wherein the new backup is consistent.

16. The non-transitory storage medium of claim 11, wherein the event is a change in regulations associated with backups generated by the data protection system, a change in a cadence of the backups, a change in a retention period of the backups, detection go inconsistent data in the journal.

17. The non-transitory storage medium of claim 11, the operations further comprising hardening the backup such that the backup is guaranteed consistent.

18. The non-transitory storage medium of claim 11, the operations further comprising virtually synthesizing the backup.

19. The non-transitory storage medium of claim 11, the operations receiving a policy that is associated with backups generated by the data protection system, wherein the policy changes a schedule associated with the backups.

20. The non-transitory storage medium of claim 11, the operations further comprising applying a heuristic to backups associated with the data protection system in response to the event, wherein the heuristic is one of deleting a specific backup, replacing the specific backup with another backup that is associated with a different time than the specific backup.

\* \* \* \* \*